United States Patent [19]

Shimizu et al.

[11] 3,812,512
[45] May 21, 1974

[54] ELECTRONIC SHUTTER FOR PHOTOGRAPHIC CAMERAS

[75] Inventors: Munetaka Shimizu, Kawagoe; Masao Takayama, Tokyo, both of Japan

[73] Assignee: Kabushiki Kaisha Koparu, Tokyo-to, Japan

[22] Filed: June 27, 1973

[21] Appl. No.: 374,068

[30] Foreign Application Priority Data
June 30, 1972 Japan.............................. 47-65722

[52] U.S. Cl.............................. 354/258, 95/10 CT
[51] Int. Cl. ............................................ G03b 9/64
[58] Field of Search ............. 95/10 CT, 53 EB, 53.3

[56] References Cited
UNITED STATES PATENTS
3,745,902 7/1973 Taguchi................................ 95/53.3
3,726,200 4/1973 Ogiso et al............................ 95/53.3
3,641,902 2/1972 Kikuchi et al. ....................... 95/53.3

*Primary Examiner*—Samuel S. Matthews
*Assistant Examiner*—Michael L. Gellner
*Attorney, Agent, or Firm*—Cushman, Darby & Cushman

[57] ABSTRACT

An electronic shutter for photographic cameras comprising a C-R delay circuit inserted into between an exposure time control circuit and a power source for making time lag between the operation of shutter button and the start of operation of said exposure time control circuit by said delay circuit, thus the whole composition of a shutter means is simplified by utilizing said time lag as working time of self-timers or as time necessary to leap up a mirror of reflex cameras. Said exposure time control circuit contains another delay circuit necessary for full synchronization of a flash device.

6 Claims, 5 Drawing Figures

ELECTRONIC SHUTTER FOR PHOTOGRAPHIC CAMERAS

BACKGROUND OF THE INVENTION a. Field of the Invention

The present invention relates to an electronic shutter for photographic cameras, particularly to a shutter control circuit in which delay circuits possible to gain working time of a self-timer and/or time necessary to leap up a mirror of reflex cameras are added to an exposure time control circuit.

b. Description of the Prior Art

In an electronic shutter, a combination of the exposure time control circuit adpated to electrically control the opening and closing action of shutter blade and an independent delay circuit to electrically delay the time from the camera release until the starting action of said exposure time control circuit for the purpose of using a self-timer or flash device has already been proposed.

However, in such a known electronic shutter, there is a fault that its mechanism becomes complex, because the delay of period of action starting of the exposure time control circuit by said delay circuit is adpated to be controlled through the mechanism arrangement which consists of an electromagnetic device connected to said delay circuit and a switch which composes a part of said exposure time control circuit and is placed opposite to said electromagnetic device.

Further, the known electronic shutter has been so composed that the delay circuit utilized for the self-timer and the delay circuit utilized for the full synchronization with the flash device can not work continuously in predetermined order.

Also, in case that an electronic shutter in which the opening action of shutter blade is electrically controlled is equipped to a single-lens reflex camera with an automatic diaphragm means, and by the camera release operation, the exposure time control circuit is operated and in parallel the automatic diaphragm means and the mirror mechanism is released, the relation between either necessary time until the diaphragm blade will stop in the position of the minimum diaphragm aperture or necessary time until the mirror will get away from the photographing light path to its outside (preferably, time until the mirror will stop in the position of leaping up) and the period of release of the shutter blade becomes an important problem. That is, the motion of the diaphragm means and the getting away motion from the photographing light path have to be finished before the release of the shutter blade.

SUMMARY OF THE INVENTION

A primary object of the present invention is to provide an electronic shutter for photographic cameras in which the first delay circuit is added to the exposure time control circuit and the second delay circuit is assembled into said exposure time control circuit, thus being composed as possible to utilize the first delay circuit as for self-timer or for the purpose to secure the time necessary for action of the diaphragm device or leaping up the mirror, also to utilize the second delay circuit for the purpose to be fully synchronized the flash device.

Another object of the present invention is to provide an electronic shutter for photographic cameras inserting the delay circuit between the exposure time control circuit and the power source battery, thus composing to delay the time from the camera release to the action starting of said exposure time control circuit.

Still another object of the present invention is to provide an electronic shutter for photographic cameras in which the first delay circuit utilized for the self-timer and the second delay circuit utilized for the full synchronization of flash device are possible to work in a predetermined order and continuously.

Other objects and advantages will become apparent from the following description of an illustrative, preferred embodiment of the present invention.

DESCRIPTION OF THE PREFERRED EMBODIMENTS

Figure 1:
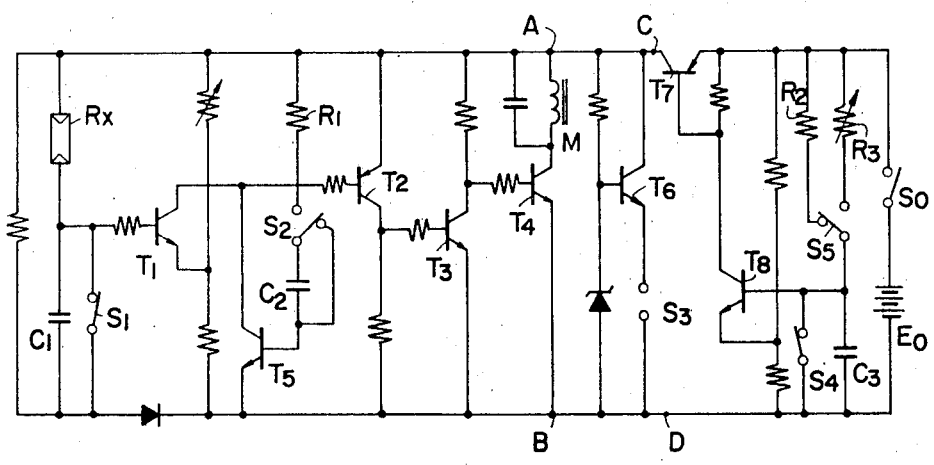
FIG. 1 is a circuit diagram of the electronic shutter according to the present invention.

Referring to FIG. 1, reference symbols $R_x$ and $C_1$ represent a photoconductive element (for example CdS element) and a capacitor composing the light volume integral circuit. Reference symbols $S_1$ represents a switch connected in parallel with the capacitor $C_1$, and this switch can be made open as interlocking with the opening action of shutter blade. Reference symbol $T_1$ represents a switching transistor, reference symbols $T_2$, $T_3$ and $T_4$ represent amplifying transistors. Reference symbol M represents an electromagnet, when it is energized, it makes start of the opening action of shutter, and when it is de-energized, it makes start of the closing action of shutter. The exposure time control circuit of the electric shutter which has already been known may be composed by the above-mentioned elements. Reference symbols $R_1$ and $C_2$ represent a resistor and a capacitor composing the second delay circuit, when FP-class flash device is used, this delay circuit is useful for the purpose of delaying the opening action of shutter until a predetermined time passes.

Reference symbol $T_5$ represents a transistor of which base is connected to said delay circuit and collector is connected to the base of the transistor $T_2$.

Reference symbol $S_2$ represents a switch making the above-mentioned delay circuit at the time of use of the flash device. This switch $S_2$ serves, in an ordinary condition, to make the discharge circuit of the capacitor $C_2$, when the flash device is mounted on a camera-body, the switch $S_2$ connects the resistor $R_1$ and capacitor $C_2$ to make said delay circuit.

Reference symbol $T_6$ represents a transistor, reference symbol $S_3$ represents a contact terminal of flash device, reference symbol $T_7$ represents a power transistor, reference symbol $C_3$ represents a capacitor, reference symbol $R_2$ represents a resistor. The delay circuit is consisted of the capacitor $C_3$ and resistor $R_2$, this delay circuit is useful for delaying the conduct period of the transistor $T_7$ through the transistor $T_8$ until the finish of operation of the disphragm means in the automatic diaphragm mechanism and/or the finish of leap up motion of the mirror. Reference symbol $R_3$ represents a variable resistor, with said capacitor $C_3$, it composes the another delay circuit which is useful for delaying the conduct period of the transistor $T_7$ until the time corresponding to the operation of the self-timer lapse. The above-mentioned two delay circuits compose the first delay circuit. Reference symbol $S_4$ represents a switch connected in parallel with the capacitor $C_3$, it is adapted to be made open as interlocking with a power source switch $S_0$ mentioned after. Reference symbol $S_5$ represents a switch, usually it is connected to the side of the resistor $R_3$, it can be switched to the side of the variable resistor $R_3$ as interlocking with self-timer setting member (not shown), and it serves to make each delay circuit.

Figure 2:
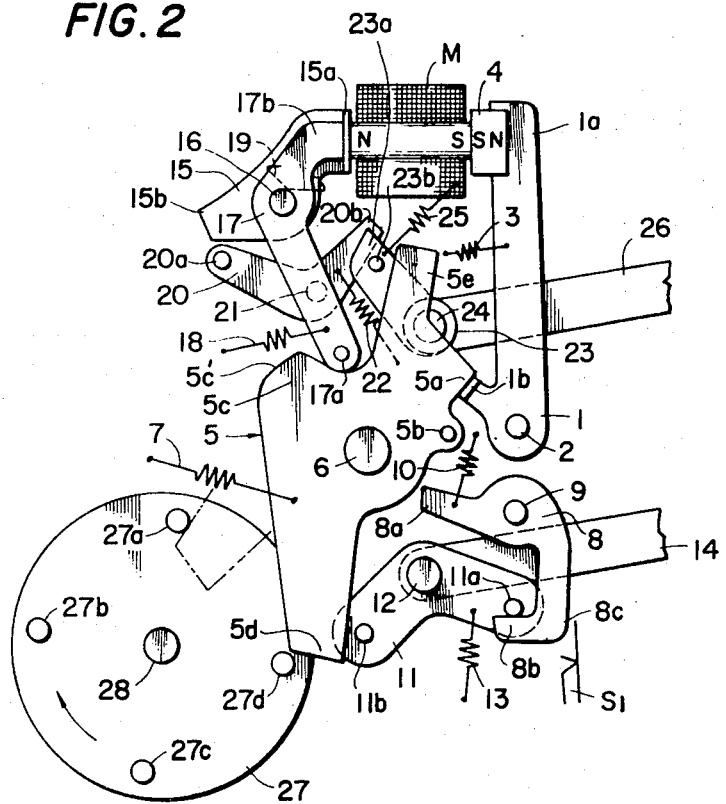
FIG. 2 is a main plan view of an opening and closing mechanism of the shutter used with the circuit shown in FIG. 1.

Next, in the FIG. 2, reference symbol M represents the electromagnet shown in the FIG. 1, reference numeral 1 represents a release lever having an arm 1a and a bending portion 1b, it is pivoted at a shaft 2, and is given the counterclockwise turning force by a spring 3. Reference numeral 4 represents a permanent magnet installed to the arm 1a of the release lever 1, it is adapted to be attracted by the electromagnet M. Reference numeral 5 represents an operation lever having a stepped portion 5a engaged with the bending portion 1b of the release lever 1, and providing a pin 5b, further comprising a cam 5c, arms 5d and 5e, and it is pivoted at a shaft 6, is given the clockwise turning force by a spring 7. Reference numeral 8 represents an opening release lever having an arm 8a and a hook portion 8b engageable with the pin 5b of the lever 5, it is pivoted at a shaft 9, and given the clockwise turning force by a spring 10. Still, when the arm 8a is pressed by the pin 5b and turned counterclockwise against the tension of the spring 10, the lever 8 opens the switch $S_1$ shown in the FIG. 1 by its rounded corner 8c. Reference numeral 11 represents a front blade driving lever having a pin 11a engaged with the hook portion 8b of the opening release lever 8 and having a pin 11b engageable with the arm 5b of the operation lever 5, it is fixed to a rotary shaft 12, and is given the clockwise turning force by a spring 13. Reference numeral 14 represents a front blade operation arm, it is fixed to a shaft 12 as one body with the front blade driving lever 11. Reference numeral 15 represents a magnet lever having a bending portion 15a possible to be attracted to the another side of the electromagnet M and an arm 15b, it is pivoted at a shaft 16. Reference numeral 17 represents a holding lever having a pin 17a possible to engage with the cam 5c of the operation lever 5 and having an arm 17b used for pressing the bending portion 15a to the electromagnet M, it is pivoted at a shaft 16, and is given the clockwise turning force by a spring 18. Reference numeral 19 represents a spring strained between the magnet lever 15 and the holding lever 17, it is tensioned by the counterclockwise rotation of the holding lever 17, and it works as a departure force (counterclockwise turning force) from the electromagnet M for the magnet lever 15. Reference numeral 20 represents a closing release lever having a pin 20a possible to engage with the arm 15b of the magnet lever 15, and having a bend portion 20b, it is pivoted at a shaft 21, and is given the clockwise turning force by a spring 22. Reference numeral 23 represents a rear blade driving lever having an arm 23a engaged with the bend portion 20b of the lever 20 and having a pin 23b possible to engage with the arm 5e of the operation lever 5, it is fixed to a rotary shaft 24, and is given the clockwise turning force by a spring 25. Reference numeral 26 represents a rear blade operation arm fixed to the shaft 24 with the rear blade driving lever 23. Reference numeral 27 represents a cocking disk having four pins 27a to 27d possible to engage with the arm 5d of the operation lever 5. A rotary shaft 28 is rotated clockwise by a motor not shown, and it is adapted to turn around a quarter of the disk 27 by one operation.

The electronic shutter according to the present invention is operated in the manner as described hereunder.

The camera described herein is a single reflex camera equipped with a focal plane shutter, an automatic diaphragm mechanism and a mirror mechanism. Also, this camera is so composed that by the camera release, the above two mechanisms are released from their charged positions and the power source switch $S_0$ is closed.

Then, if the camera release operation is done from the condition shown in the drawings the power source switch $S_0$ is closed, switch $S_4$ is opened, and the automatic diaphragm mechanism and the mirror mechanism are released.

Generally, the automatic diaphragm mechanism requires some time to move the diaphragm blade from its position of the full open to the preset position and stops there, and also the mirror mechanism requires some time to get away the mirror from the photographing light path to its outside.

In the FIG. 1, in the initial stage that the power source switch $S_0$ is closed, the base electric potential of the transistor $T_8$ is lower, thus said transistor $T_8$ is in cut-off state, and the transistor $T_7$ also is in cut-off state. Then, the electric voltage is not given to the conjunction points A and B, and the electromagnet M is not still energized. After the time which is determined by the resistor $R_2$ and capacitor $C_3$, i.e., the time which the diaphragm blade moves from its full open position and stops in the preset position, or the mirror get away from the photographing light path to its outside, passes, as the base electric potential of the transistor $T_8$ becomes higher than its emitter bias electric potential, the transistor $T_8$ is conducted, and the transistor $T_7$ is also conducted, the power source $E_0$ is substantially connected to the conjunction points A and B.

As the result of it, the transistor $T_4$ is conducted, the electromagnet M is energized. The electromagnet M generates the magnetism of the polarity shown in the FIG. 2, it attracts the bend portion 15a of the magnet lever 15, otherwise it repels the permanent magnet 4 being attracted until that period. Accordingly, the release lever 1 is rotated clockwise against the tension of the spring 3, the bend portion 1b of the release lever 1 is disengaged from the stepped portion 5a of the operation lever 5. Therefore, the operation lever 5 is rotated clockwise by the tension of the spring 7, it presses the pin 17a by its cam 5c, rotates counterclockwise the holding lever 17 against the tension of the spring 18, and tensions the spring 19 tensed between the magnet lever 15 and the holding lever 17. And the pin 17a is placed in the highest position 5c' of the cam 5c, and the charge volume of the spring 19 is kept constant. Next, the arm 8a is pushed by the pin 5b, the opening release lever 8 is rotated counterclockwise against the tension of the spring 10, the switch $S_1$ is opened by the rounded corner 8c, and the hook portion 8b is disengaged from the pin 11a. Accordingly, the light volume integral circuit consisted of the photoconductive element $R_x$ and capacitor $C_1$ starts to act, the open driving lever 11 is rotated clockwise by the tension of the spring 13, and the front blade not shown is opened by the rotation of the front blade operation arm 14. After the specified time determined by the light volume integral circuit passes, the transistor $T_1$ is conducted, and the transistors $T_2$ and $T_3$ are also conducted. As the result of it, the transistor $T_4$ becomes cut off, and the electromagnet M is de-energized. Upon the de-energization of the electromagnet M, the magnet lever 15 is rotated counterclockwise by the force of the spring 19, the arm 15b presses the pin 20a. Accordingly, the closing release lever 20 is rotated counterclockwise against the tension of the spring 22 to disengage the bending portion 20b from the arm 23a. Consequently, the rear blade driving lever 23 is rotated clockwise by the tension of the spring 25 to close the rear blade not shown through the rear blade operation arm 26, and one cycle of the photographing operation is completed.

In this embodiment, the cocking operation of the shutter is carried out by a motor drive and the operation lever 5 in the uncocked condition is placed in the position shown by the two point dot line of the arm 5d, where, if the cocking disk 27 is rotated by a quarter rotation to the direction of the arrow mark, the arm 5d is pushed by the pin 27a, and the operation lever 5 is rotated counterclockwise against the tension of the spring 7. Accordingly, the pin 11b is pushed by the arm 5d and the front blade driving lever 11 is rotated counterclockwise against the tension of the spring 13, while the pin 23b is pushed by the arm 5e and the rear blade driving lever 23 is rotated counterclockwise against the tension of the spring 25, and also the operation lever 5 releases the pushing to the opening release lever 8 by the pin 5b and the pushing to the holding lever 17 by the cam 5c, the operation lever 5 is returned to the cocked position shown in the drawing.

Next, in the case of photographing using the self-timer, the switch $S_5$ is connected to the variable resistor $R_3$ by the setting operation of the self-timer setting member not shown in the drawing. Accordingly, the delay circuit consisted of said resistor $R_2$ and capacitor $C_3$ is switched over to the delay circuit consisted of the variable resistor $R_3$ and capacitor $C_3$. The time interval while the power source switch $S_O$ closes and the transistor $T_7$ is conducted, being caused by the said delay circuit, is utilized as a working time of the self-timer. The working time of the self-timer is possible to set optionally by changing the resistance value of the variable resistor $R_3$. The operation after the working of the self-timer is the same as the aforementioned.

However, as the time while the diaphragm blade moves from the position of full open to the preset position and stops, or the mirror gets away from the light path is passably shorter than the working time of the self-timer, during the working of the self-timer, the diaphragm blade stops in the position of the preset diaphragm aperture, and the mirror gets away outside of the photographing light path.

Additionally, in one of the operation mode mentioned above, in case of using a X-class flash device, the flash circuit may be connected to the terminal $S_3$. That is, in this shutter, there is no so-called synchro-contact as in well known shutter means, but when the transistor $T_7$ is conducted, the transistor $T_6$ is also conducted, and the flash device emits the flash light like as the synchro-contact is closed.

Further, in the case of photographing using FP-class flash device, the switch $S_2$ is connected to the side of the resistor $R_1$. As like the above mentioned, when the transistor $T_7$ is conducted, the flash device emits light. But, in the left side circuit of the conjunctions A and B, the integral circuit consisted of the resistor $R_1$ and capacitor $C_2$ starts its action. In its initial stage, an electric potential of the transistor $T_5$ is high, and, therefore, as said transistor $T_5$ is made conductive and the transistors $T_2$ and $T_3$ are also conducted, the transistor $T_4$ becomes cut-off state, the electromagnet M is not energized. And when the time determined by said delay circuit, i.e., the time necessary to synchronize the emitting light of FP-class flash device and the period of full open of the shutter passes, the electric potential of the base of the transistor $T_5$ lowers than the specified value, and the transistor $T_5$ becomes cut off. Consequently, at this time, firstly the transistor $T_4$ is conducted and the electromagnet M is energized. The action after the electromagnet M is energized is the same as the aforementioned.

Figure 3:
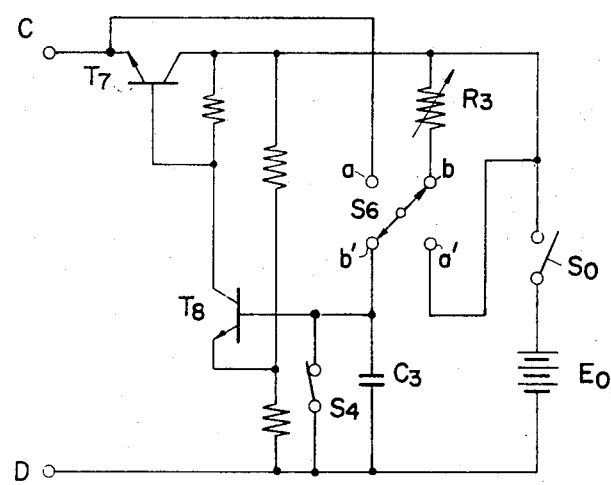
FIG. 3, 4 and 5 are partial circuit diagrams showing another embodiments of the circuit shown in FIG. 1, respectively.

Next, when the device according to the present invention is applied to a camera which does not equip the mirror mechanism but equips a lens shutter of a diaphragm preset type or a program type, the right side circuit of conjunction points C and D shown in the FIG. 1 may be replaced by the circuit shown in the FIG. 3. That is, the condition shown in the FIG. 3 is the same as the case of using the self-timer, but at photographing not to use the self-timer, the switch is $S_6$ is connected to the terminals a and a'. In this case, when the power sourse switch $S_O$ is closed, the power sourse E is directly connected to the conjunction points A and B. Still, in this case, it is a matter of course that said FP-class flash device should be replaced by the M-class flash device.

Figure 4:
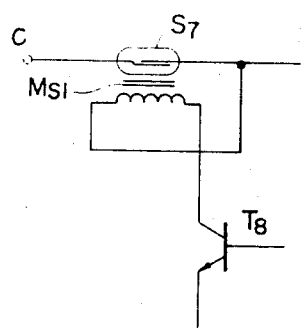
Figure 5:
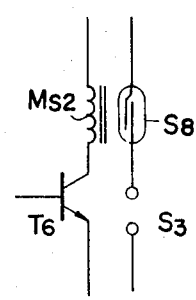

In the above-mentioned description, the opening action and the closing action of shutter are done by a single electromagnet, however it is possible to perform each action by the separate electromagnet, or the electromagnet can be replaced with the other electromagnetic device, for example, a plunger. Also it is possible that the transistor $T_7$ shown in the FIG. 1 and the FIG. 3 can be replaced with a reed switch $S_7$ opening and closing by an electromagnet $M_{sl}$ connected to the collector of the transistor $T_8$ as shown in the FIG. 4. Further, in the control of the flash device, the known flash device solely closes the synchro-contact without relation to the electric shutter circuit. Accordingly, if the flash device is controlled through the transistor $T_6$ as shown in the FIG. 1, the other circuit factor not shown is necessary, and it seems that the noise at the period of emitting light gives the other partial circuit harmful influence. Further, as there is a problem as to the electric conductivity of the transistor, a reed switch $S_8$ corresponding to the synchro-contact may be connected in the shutter circuit so as to control by a electromagnet $M_{sl}$ connected to the collector of the transistor $T_6$, for example, as shown in FIG. 5.

We claim:

1. An electronic shutter for photographic cameras comprising an exposure time control circuit including a light volume integral circuit, a switching transistor connected to said light volume integral circuit, amplifying transistors connected to said switching transistor, and an electromagnet connected to the output side of said amplifying transistors, a switching means connected to said exposure time control circuit, a first delay circuit connected to said switching means and capable of controlling the opening and closing of said switching means, a power source battery connected to said first delay circuit, and a power source switch connected in series to said power source battery said switching means being connected between said exposure time control cirucit and said power source battery, said first delay circuit being used for delaying the time from closure of said power source switch to commencement of action of said exposure time control circuit.

2. An electronic shutter for photographic cameras according to claim 1, in which said first delay circuit consists of capacitor and two kind of resistor connectable to said capacitor.

3. An electronic shutter for photographic cameras according to claim 2, in which one of said resistors is a variable resistor.

4. An electronic shutter for photographic cameras according to claim 1, in which said switching means is a transistor.

5. An electronic shutter for photographic cameras according to claim 1, in which said switching means is a reed switch.

6. An electronic shutter for photographic cameras according to claim 1, in which said exposure time control circuit includes a first transistor having collector connected to the collector of said switching transistor, a second delay circuit connectable to the base of said first transistor, a second transistor connected in parallel to said transistor amplifying circuit and a contact terminal for a flash device connected to the emitter of said second transistor, said second delay circuit being used for the full synchronization of the period of emitting light of said flash device with the period of the full open of the shutter blade.

* * * * *